(12) United States Patent
Laxminarayana et al.

(10) Patent No.: US 10,658,759 B2
(45) Date of Patent: May 19, 2020

(54) SYSTEM AND METHOD FOR TWO-WAY GROUND AND SATELLITE BASED COMMUNICATION USING MILLIMETER WAVES

(71) Applicant: ASTROME TECHNOLOGIES PRIVATE LIMITED, Bangalore (IN)

(72) Inventors: Prasad Horabailu Laxminarayana, Bangalore (IN); Neha Satak, Bangalore (IN)

(*) Notice: Subject to any disclaimer, the term of this patent is extended or adjusted under 35 U.S.C. 154(b) by 0 days.

(21) Appl. No.: 16/068,884

(22) PCT Filed: Jan. 6, 2017

(86) PCT No.: PCT/IN2017/000005
§ 371 (c)(1),
(2) Date: Jul. 9, 2018

(87) PCT Pub. No.: WO2017/118999
PCT Pub. Date: Jul. 13, 2017

(65) Prior Publication Data
US 2019/0020119 A1    Jan. 17, 2019

(30) Foreign Application Priority Data
Jan. 8, 2016  (IN) .............................. 201641000745

(51) Int. Cl.
*H01Q 21/06* (2006.01)
*H01Q 25/00* (2006.01)
(Continued)

(52) U.S. Cl.
CPC ............. *H01Q 21/06* (2013.01); *H01Q 25/00* (2013.01); *H01Q 25/002* (2013.01); *H04B 7/0617* (2013.01); *H04B 7/185* (2013.01); *H04B 7/1851* (2013.01); *H04B 7/2041* (2013.01); *H04W 76/00* (2013.01); *H04W 52/241* (2013.01); *H04W 52/42* (2013.01); *Y02D 70/446* (2018.01)

(58) Field of Classification Search
CPC ... H04W 28/04; H04W 72/04; H04W 72/042; H04W 88/08; H04L 5/0007
USPC ....................................................... 370/329
See application file for complete search history.

(56) References Cited

U.S. PATENT DOCUMENTS

2002/0177405 A1* 11/2002 Chedester .............. G01V 8/005
455/39
2011/0243040 A1* 10/2011 Khan ................... H04B 7/0617
370/280

* cited by examiner

*Primary Examiner* — Gbemileke J Onamuti
*Assistant Examiner* — Sanjay K Dewan (57) ABSTRACT

The embodiments herein provide a system and method for terrestrial to terrestrial or terrestrial and space or space to space communication systems, with millimeter waves. The system enables narrow angle beam and wide angle beam communication between receivers and transmitters that are in relative motion with other receivers and transmitters in the system. The system provides uninterrupted service and good spectrum utilization by combining Spatial Division Multiple Access (SDMA) and Frequency Division Multiple Access (FDMA) technologies. The system minimizes overall power required by a communication system by dynamically enabling and disabling specific channels based on user-availability and need. The system also increases or decreases power based on channel quality in order to maintain desired bit-rate of communication. The system also covers a large service area through a plurality of narrow angle signal beams.

16 Claims, 7 Drawing Sheets

(51) Int. Cl.
*H04B 7/185* (2006.01)
*H04B 7/06* (2006.01)
*H04B 7/204* (2006.01)
*H04W 76/00* (2018.01)
*H04W 52/24* (2009.01)
*H04W 52/42* (2009.01)

SYSTEM AND METHOD FOR TWO-WAY GROUND AND SATELLITE BASED COMMUNICATION USING MILLIMETER WAVES

CROSS REFERENCE TO RELATED APPLICATIONS

This patent application is a National Phase application corresponding to the PCT Application No. PCT/IN2017/000005 filed on Jan. 6, 2017 with the title "A SYSTEM AND METHOD FOR TWO-WAY GROUND AND SATELLITE BASED COMMUNICATION USING MILLIMETER WAVES". This patent application claims the priority of the Indian Provisional Patent Application No. 201641000745 filed on Jan. 8, 2016 with the title "A SYSTEM AND METHOD FOR TWO-WAY SATELLITE BASED COMMUNICATION USING MILLIMETER WAVES", the contents of which is included herein by the way of reference.

BACKGROUND

Technical Field

The embodiments herein are generally related to a communication system for terrestrial to terrestrial, terrestrial to space or vice-versa and space to space communication systems in a plurality of frequency bands. The embodiments herein are particularly related to a communication system between terrestrial and space communication systems and a communication method enabled by millimeter waves. The embodiments herein are more particularly related to space to space communications and communication between terrestrial and space communication systems enabled by millimeter waves of frequencies in ranges of 57-66 GHz, 66-71 GHz, 71-76 GHz and 81-86 GHz.

Description of the Related Art

The wavelength of millimeter waves are comparable to a size of a fabricated printed circuit board (PCB) connections and thereby resulting in high path losses due to the track becoming antenna and receivers by themselves.

Currently, there are no systems and methods to optimally use the millimeter waves in enabling a communication between the systems, in which a transmitter and receiver are relatively in motion with respect to each other. Also, there are no systems and methods to optimally reuse spectrum to establish communication links between one transmitter and multiple receivers, and vice versa.

Hence, there is a need for a system and method for developing integrated hardware and software solutions for millimeter wave enabled communication such that the connection losses encountered by a normal PCB circuit are avoided. There is also a need to develop millimeter wave enabled communication devices that are capable of communicating between space and terrestrial systems. Further there is a need for new antenna hardware and associated systems, to reuse precious spectrum resources effectively.

The above mentioned shortcomings, disadvantages and problems are addressed herein and which will be understood by reading and studying the following specification.

OBJECT OF THE EMBODIMENTS HEREIN

The primary object of the embodiments herein is to provide a communication system for terrestrial to terrestrial only, or terrestrial and space or space to terrestrial or space to space and a communication method enabled by millimeter waves.

Another object of the embodiments herein is to provide a system and method for terrestrial to terrestrial only, or terrestrial and space or space to terrestrial or space to space communication systems operated in millimeter waves of frequencies in ranges of 57-66 GHz, 66-71 GHz, 71-76 GHz and 81-86 GHz.

Yet another object of the embodiments herein is to develop a communication system and method for a narrow angle beam and a wide angle beam communication between receivers and transmitters.

Yet another object of the embodiments herein is to enable a communication system and method, when the transmitters and receivers are in relative motion with each other.

Yet another object of the embodiments herein is to provide a communication system in which a delay correction due to a beam-forming related delay is enabled in baseband rather than after a high frequency (millimeter wave) carrier is applied.

Yet another object of the embodiments herein is to provide a communication system and method for scaling the number of beams and dynamically changing the number of beams.

Yet another object of the embodiments herein is to provide a communication system and method for steering the beams to track the transmitter/receiver.

Yet another object of the embodiments herein is to provide a communication system and method for reusing a spectrum band at different spatial orientations through Spatial Division Multiple Access (SDMA) technique/technology.

Yet another object of the embodiments herein is to provide a communication system and method for using the multiple spectrum band slots in one or more spatial orientations through Frequency Division Multiple Access (FDMA) technique/technology.

Yet another object of the embodiments herein is to provide a communication system and method for providing an uninterrupted service and to use spectrum effectively and efficiently by combining Spatial Division Multiple Access (SDMA) and Frequency Division Multiple Access (FDMA) techniques/technologies.

Yet another object of the embodiments herein is to provide a communication system and method for changing a communication channel bit-rate and/or bandwidth to maintain a reliable communication.

Yet another object of the embodiments herein is to provide a communication system and method for projecting a plurality of beams shaped in a particular way to scan particular objects or persons for medical security purposes.

Yet another object of the embodiments herein is to provide a communication system and method to cover a large service area through a plurality of narrow angle signal beams.

Yet another object of the embodiments herein is to provide a communication system and method to minimize overall power required by a communication system by dynamically enabling and disabling specific channels based on user-availability and need.

Yet another object of the embodiments herein is to provide a communication system and method to increase or decrease power to specific narrow beams based on desired channel quality in a communication system.

These and other objects and advantages of the embodiments herein will become readily apparent from the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a communication system between two terrestrial systems or terrestrial and space systems or two space systems and a communication method through millimeter waves. The embodiments also provide a communication system and a communication method through a millimeter waves of frequencies in ranges of 57-66 GHz, 66-71 GHz, 71-76 GHz and 81-86 GHz.

According to one embodiment herein, a narrow angle beam and a wide angle beam communication between a receiver and a transmitter is provided.

According to one embodiment herein, the communication is enabled even in case of relative motion between the receiver and transmitter.

According to one embodiment herein, a communication system is provided to carry out a delay correction related to a beam-forming delay. The delay correction is enabled in baseband after an application of a high frequency (millimeter wave) carrier. The number of beams is scalable and changed dynamically.

According to one embodiment herein, a communication system is provided for reusing communication spectrum at different spatial orientations. The communication spectrum at different spatial orientations is reused through Spatial Division Multiple Access (SDMA) technology. The system is also enabled to use multiple spectrum slots in one or more spatial orientations through Frequency Division Multiple Access (FDMA) technology. The system is also configured to provide an uninterrupted service and to use communication spectrum effectively by combining Spatial Division Multiple Access (SDMA) and Frequency Division Multiple Access (FDMA) techniques/technologies.

According to one embodiment herein, a communication system is provided to change a communication channel bit-rate. By changing the bit-rate, a reliable communication is maintained through an effective utilization of available bandwidth. The system is also configured to cover a large service area through a plurality of narrow angle signal beams. The embodiment herein is configured to minimize an overall power required by a communication system by dynamically enabling and disabling the specific channels based on a user-availability and a need. The system is also configured to increase or decrease the power to the specific narrow beams based on a desired channel quality in a communication system.

According to one embodiment herein, the system is configured to acquire and track a transmitter and receiver is enabled. The transmitter and receiver are configured to detect a direction of communication, especially when a current location of transmitter or receiver is not known to either or both transmitter and receiver, and/or, when a communication is enabled through narrow beams. In order to acquire the direction of communication, the wide angle beams are used (in "acquisition" mode) to communicate a trajectory information with a very low data-rate. The system is configured to use narrow angle beams (in "data" mode) for high data-rate communication. The embodiment herein is also employed with the following variations. The low frequency bands are used for acquisition mode and high frequency bands are used for high data-rate. The ISM bands are used for acquisition mode as low data-rate is sufficient to communicate trajectory information. The "Acquisition" mode is regularly used to enable regular broadcast of trajectory information. According to an embodiment herein, the trajectory information comprises only position information, and optionally higher order information such as velocity and acceleration. According to an embodiment herein, the trajectory information comprises only current time information and/or past and/or future information.

According to an embodiment herein, a system is provided for one-to-many and/or many-to-many communication using a point-to-multipoint communication technology with millimeter waves. The system comprises a plurality of transmitters, a plurality of receivers, a transmitting medium, a plurality of non-planar 2D and 3D array of elements with a reflector/lens assembly to achieve an electronically wide-steerable narrow-beam antenna, and QAM schemes for modulation and demodulation and a plurality of low noise amplifiers or power amplifiers. Each of the plurality of transmitters comprises a hardware processor, a memory, a server and an array of transmitting antennas. Each of the plurality of receivers comprises a hardware processor, a memory, a server and an array of receiving antennas. The beams of a non-planar array of antenna are shaped to optimize a performance of the antennas. The demodulation is performed through soft demodulation and hard demodulation techniques. The plurality of small low noise amplifiers or power amplifiers are configured to provide an uninterrupted communication service with an optimized power consumption for varying (different) channel conditions. A plurality of beams is formed with transmitting/receiving antenna for an efficient reuse of communication spectrum through a combined use of Spatial Division Multiple Access (SDMA) and Frequency Division Multiple Access (FDMA) techniques.

According to an embodiment herein, each of the plurality of transmitters comprises a hardware processor. Each of the hardware processors further comprises a plurality of field programmable gate arrays (FPGA), a plurality of general purpose processors and a plurality of application specific integrated circuits (ASIC). The field programmable gate arrays and the application specific integrated circuits are configured/designed to predominantly provide fine-grained processing of all the information that are transmitted from the transmitter.

According to an embodiment herein, each of the plurality of transmitters comprises a server. Each of the servers comprises all the information that is transmitted and the data that enables the transmission of the information. The data in the server controls the higher level functioning of the transmitter.

According to an embodiment herein, each of the plurality of receivers comprises a hardware processor. Each of the hardware processors further comprises a plurality of field programmable gate arrays, a plurality of general purpose processors and a plurality of application specific integrated circuits. The field programmable gate arrays and the application specific integrated circuits are configured to predominantly provide fine-grained processing of all the information received in the receiver.

According to an embodiment herein, each of the plurality of receivers comprises a server. Each of the servers comprises all the information that is received and the data that enables receiving the information. The data in the server controls the higher level functioning of the receiver.

According to an embodiment herein, the plurality of transmitters and receivers are relatively in motion with each other.

According to an embodiment herein, a method is provided for one-to-many and/or many-to-many communication through millimeter waves using a point-to-multipoint communication technology. The method comprises the following steps: defining a process for a formation of maximum number of multiple beams that are physically attainable/achieved by an array of antennas; configuring a plurality of non-planar array of antenna elements with or without a reflector/lens assembly to achieve an electronically wide-steerable narrow-beam antenna; shaping a beam of a non-planar 3D array of antenna and non-planar 2D array of antenna to optimize a performance of the antennas; performing a soft demodulation for a quadrature amplitude modulation scheme; performing a hard demodulation for a quadrature amplitude modulation scheme; providing an uninterrupted communication service with optimized spectrum utilization through a combined use of Spatial Division Multiple Access (SDMA) and Frequency Division Multiple Access (FDMA) techniques; acquiring information and tracking data of a transmitter and/or a receiver; optimizing a power utilization of the communication system; automatically calibrating an array of antennas; and configuring an array of antennas for operation in terrestrial applications.

According to an embodiment herein, the plurality of non-planar array of antenna elements with or without a reflector/lens assembly is configured to achieve an electronically wide-steerable narrow-beam antenna through a use of a plurality of non-planar array of elements with or without a reflector/lens assembly. The non-planar array is configured to achieve a very large steerability angle of 360 degrees. The non-planar array in combination of lens/reflector is configured to achieve an electronically wide-steerable narrow-beam antenna. The non-planar array is configured/designed in a plurality of shapes including square, trapezoidal, hexagonal, circular and spherical, and the non-planar array is configured for a plurality of types of lens and reflectors.

According to an embodiment herein, a beam of a non-planar 2D and 3D array of antennas is shaped by a process comprising the following steps: defining a radiation origin point and a normal vector along a direction of interest; representing positions of individual array elements and the corresponding normal vectors with the radiation origin point as the coordinate frame of origin; projecting a position of each of the array elements that contributes to radiation along a direction of interest; computing a window function with desired parameter values, computing weights to be assigned to each of the elements based on relative footprint of each element in the window function; and multiplying a signal of an array element with the weight computed for the particular array element.

According to an embodiment herein, the process for shaping a beam of non-planar 2D array of antennas and shaping a beam of non-planar 3D array of antennas are varied based on a type of application. The type of application comprises faster or leaner implementation, implementing with superior accuracy, antenna projection boundary with a lowest distance and antenna projection boundary with a highest distance.

According to an embodiment herein, a process of a soft demodulation for a quadrature amplitude modulation scheme is provided. The process comprises performing demodulation by defining confidence numbers for individual bits of information and representing mid-points for decision making regarding individual bits from Most-Significant Bit to Least Significant Bit. The soft demodulation process is provided for a plurality of wired and wireless communication systems apart from a millimeter wave communication.

According to an embodiment herein, a process of a hard demodulation for a quadrature amplitude modulation scheme is provided. The process comprises creating a lookup table with entries as a plurality of b-bit values corresponding to each symbol. The hard demodulation process is provided for a plurality of wired and wireless communication systems apart from the millimeter wave communication.

According to an embodiment herein, an uninterrupted communication service is provided with an optimum spectrum utilization. The communication service comprises a combined use of Spatial Division Multiple Access (SDMA) and Frequency Division Multiple Access (FDMA) techniques. The spatial orientations are uniformly divided into a plurality of spatial slots to cover a desired serviceable area. A plurality of frequency bands is assigned to a plurality of spatial slots in such a way that the frequency bands are non-overlapping. The plurality of frequency bands assigned to the plurality of spatial slots is provided with guard bands to prevent interference. The spatial slots are provided to ensure that no two adjacent spatial slots are configured to utilize a same frequency band.

According to an embodiment herein, a step of optimizing the power utilization of the communication system is provided. The step comprises configuring a plurality of small low noise amplifiers or power amplifiers in an antenna element and remainder of the system, and/or increasing a number of array elements along with small low noise amplifiers or power amplifiers. According to an embodiment herein, a plurality of communication methods, such as wired communication (multi-modal optical fibres), RADAR and IR/Visible/UV/X-ray/Terahertz wave based devices, is provided.

According to an embodiment herein, a method is provided for an automatic calibration of an array of receiving antennas. The method comprises the following steps: placing a known transmitting antenna pointed towards a specific orientation $(\theta, \varphi)$ in far field with respect to receiving antenna which needs to be calibrated; performing an auto-calibration of frequency, phase and amplitude at receiver only for one specific path using standard methods; applying the frequency and amplitude corrections obtained from a specific path to all paths; transmitting a pre-set sequence of data with a predetermined modulation repeating indefinitely from a transmitting antenna, and wherein the sequence of data is similar to/same as that used in standard methods for an auto-calibration of phase in a single path; acquiring data from all paths for a preset duration and maintaining the specific path chosen in the second step as a reference; computing a phase difference in rest of the paths; computing the expected phase difference between the specific path (chosen in the second step) and rest of the paths for signal coming from direction $(\theta, \varphi)$ using standard theories: subtracting the expected phase difference from an observed phase difference to get a desired correction of phase per path; repeating the above steps for a few more relative orientations (θ, φ) of transmitting antenna with respect to receiving antenna, to determine an average of correction of phase per path; and, performing post-calibration, by performing the phase corrections in addition to expected phase difference along any direction of reception of signal.

According to an embodiment herein, a method of automatic calibration of an array of transmitting antennas comprises the following steps: placing a known receiving antenna pointing towards a specific orientation (θ, φ) in a far field with respect to transmitting antenna to be calibrated; performing auto-calibration of frequency, phase and amplitude at receiver while transmitting only from one specific path using standard methods, and wherein, the step of automatic calibration for every path other than the chosen path comprises: deactivating all paths except a current path to be calibrated and chosen path, performing a full sweep of phase offsets (−180 degrees to 180 degrees) for current path in relation to the phase of chosen path; computing a power received at the receiving antenna for each phase offset, picking up the phase offset to provide highest power; computing the expected phase difference between the chosen path and the current path for signal going to direction (θ, φ) using standard theory; subtracting the expected phase difference from observed phase difference to achieve a desired phase correction; and performing a post-calibration by performing the phase correction in addition to expected phase difference for any direction of transmission, and wherein the process is repeated for a plurality of other orientations (θ, φ) to determine an average of phase correction per path.

According to an embodiment herein, a method for an auto-calibration of the positional offsets of an array antenna is provided. Once a phase correction is configured, the system enables estimation and correction for manufacturing inaccuracies in the position of elements in the array. The estimation and correction for transmitting and receiving antenna are performed in following steps: configure one of the elements in the array as reference element; represent the observed and expected phase difference for an element, and wherein the expected phase difference includes the phase correction for a path related to the element; compute the observed and expected phase difference for a plurality of different orientations; store the computed data in a form of matrices; configure a use of least square error principal and obtain 3-dimensional positional offsets corresponding to an element in the array antenna; and, repeat the above for all elements in the array antenna to obtain a relative error with respect to the reference element.

According to an embodiment herein, the method for auto-calibration of positional offsets of array antenna is enabled for antennas where (in which) multiple antenna elements are connected to a fewer paths or RF chain. The method is also enabled for a group of elements per path. When the result comprises some residual errors, which are not exactly captured without a direct phase measurement of individual elements in a group, a plurality of isolators or switches are configured to activate or deactivate the specific elements for the purpose of measurement.

According to an embodiment herein, a flat array configuration of antenna elements is provided for terrestrial applications. For terrestrial applications such as backhaul or front haul, a wide angle steering of the beam is performed only in horizontal plane and not in the vertical plane, as transmitters and receivers are at similar altitudes. A configuration is provided for P2MP systems with a large number of elements along horizontal direction than vertical direction, such as a 90×2 patch element planar array, where 90 is along horizontal and 2 is along vertical and a 90×2 patch element non-planar array, where here again, 90 is along horizontal and 2 is along vertical. A lens or reflector or combination of lens and reflector are provided for achieving necessary beam widths for both horizontal and vertical directions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide a communication system between two terrestrial systems or terrestrial and space systems or two space systems and a communication method through millimeter waves. The embodiments also provide a communication system and a communication method through a millimeter waves of frequencies in ranges of 57-66 GHz, 66-71 GHz, 71-76 GHz and 81-86 GHz.

According to one embodiment herein, a narrow angle beam and a wide angle beam communication between a receiver and a transmitter is provided.

According to one embodiment herein, the communication is enabled even in case of relative motion between the receiver and transmitter.

According to one embodiment herein, a communication system is provided to carry out a delay correction related to a beam-forming delay. The delay correction is enabled in baseband after an application of a high frequency (millimeter wave) carrier. The number of beams is scalable and changed dynamically.

According to one embodiment herein, a communication system is provided for reusing communication spectrum at different spatial orientations. The communication spectrum at different spatial orientations is reused through Spatial Division Multiple Access (SDMA) technology. The system is also enabled to use multiple spectrum slots in one or more spatial orientations through Frequency Division Multiple Access (FDMA) technology. The system is also configured to provide an uninterrupted service and to use communication spectrum effectively by combining Spatial Division Multiple Access (SDMA) and Frequency Division Multiple Access (FDMA) techniques/technologies.

According to one embodiment herein, a communication system is provided to change a communication channel bit-rate. By changing the bit-rate, a reliable communication is maintained through an effective utilization of available bandwidth. The system is also configured to cover a large service area through a plurality of narrow angle signal beams. The embodiment herein is configured to minimize an overall power required by a communication system by dynamically enabling and disabling the specific channels based on a user-availability and a need. The system is also configured to increase or decrease the power to the specific narrow beams based on a desired channel quality in a communication system.

According to one embodiment herein, the system is configured to acquire and track a transmitter and receiver is enabled. The transmitter and receiver are configured to detect a direction of communication, especially when a current location of transmitter or receiver is not known to either or both transmitter and receiver, and/or, when a communication is enabled through narrow beams. In order to acquire the direction of communication, the wide angle beams are used (in "acquisition" mode) to communicate a trajectory information with a very low data-rate. The system is configured to use narrow angle beams (in "data" mode) for high data-rate communication. The embodiment herein is also employed with the following variations. The low frequency bands are used for acquisition mode and high frequency bands are used for high data-rate. The ISM bands are used for acquisition mode as low data-rate is sufficient to communicate trajectory information. The "Acquisition" mode is regularly used to enable regular broadcast of trajectory information. According to an embodiment herein, the trajectory information comprises only position information, and optionally higher order information such as velocity and acceleration. According to an embodiment herein, the trajectory information comprises only current time information and/or past and/or future information.

According to an embodiment herein, a system is provided for one-to-many and/or many-to-many communication using a point-to-multipoint communication technology with millimeter waves. The system comprises a plurality of transmitters, a plurality of receivers, a transmitting medium, a plurality of non-planar 2D and 3D array of elements with a reflector/lens assembly to achieve an electronically wide-steerable narrow-beam antenna, and QAM schemes for modulation and demodulation and a plurality of low noise amplifiers or power amplifiers. Each of the plurality of transmitters comprises a hardware processor, a memory, a server and an array of transmitting antennas. Each of the plurality of receivers comprises a hardware processor, a memory, a server and an array of receiving antennas. The beams of a non-planar array of antenna are shaped to optimize a performance of the antennas. The demodulation is performed through soft demodulation and hard demodulation techniques. The plurality of small low noise amplifiers or power amplifiers are configured to provide an uninterrupted communication service with an optimized power consumption for varying (different) channel conditions. A plurality of beams is formed with transmitting/receiving antenna for an efficient reuse of communication spectrum through a combined use of Spatial Division Multiple Access (SDMA) and Frequency Division Multiple Access (FDMA) techniques.

According to an embodiment herein, each of the plurality of transmitters comprises a hardware processor. Each of the hardware processors further comprises a plurality of field programmable gate arrays (FPGA), a plurality of general purpose processors and a plurality of application specific integrated circuits (ASIC). The field programmable gate arrays and the application specific integrated circuits are configured/designed to predominantly provide fine-grained processing of all the information that are transmitted from the transmitter.

According to an embodiment herein, each of the plurality of transmitters comprises a server. Each of the servers comprises all the information that is transmitted and the data that enables the transmission of the information. The data in the server controls the higher level functioning of the transmitter.

According to an embodiment herein, each of the plurality of receivers comprises a hardware processor. Each of the hardware processors further comprises a plurality of field programmable gate arrays, a plurality of general purpose processors and a plurality of application specific integrated circuits. The field programmable gate arrays and the application specific integrated circuits are configured to predominantly provide fine-grained processing of all the information received in the receiver.

According to an embodiment herein, each of the plurality of receivers comprises a server. Each of the servers comprises all the information that is received and the data that enables receiving the information. The data in the server controls the higher level functioning of the receiver.

According to an embodiment herein, the plurality of transmitters and receivers are relatively in motion with each other.

According to an embodiment herein, a method is provided for one-to-many and/or many-to-many communication through millimeter waves using a point-to-multipoint communication technology. The method comprises the following steps: defining a process for a formation of maximum number of multiple beams that are physically attainable/achieved by an array of antennas; configuring a plurality of non-planar array of antenna elements with or without a reflector/lens assembly to achieve an electronically wide-steerable narrow-beam antenna; shaping a beam of a non-planar 3D array of antenna and non-planar 2D array of antenna to optimize a performance of the antennas; performing a soft demodulation for a quadrature amplitude modulation scheme; performing a hard demodulation for a quadrature amplitude modulation scheme; providing an uninterrupted communication service with optimized spectrum utilization through a combined use of Spatial Division Multiple Access (SDMA) and Frequency Division Multiple Access (FDMA) techniques; acquiring information and tracking data of a transmitter and/or a receiver; optimizing a power utilization of the communication system; automatically calibrating an array of antennas; and configuring an array of antennas for operation in terrestrial applications.

According to an embodiment herein, the plurality of non-planar array of antenna elements with or without a reflector/lens assembly is configured to achieve an electronically wide-steerable narrow-beam antenna through a use of a plurality of non-planar array of elements with or without a reflector/lens assembly. The non-planar array is configured to achieve a very large steer ability angle of 360 degrees. The non-planar array in combination of lens/reflector is configured to achieve an electronically wide-steerable narrow-beam antenna. The non-planar array is configured/designed in a plurality of shapes including square, trapezoidal, hexagonal, circular and spherical, and the non-planar array is configured for a plurality of types of lens and reflectors.

According to an embodiment herein, a beam of a non-planar 2D and 3D array of antennas is shaped by a process comprising the following steps: defining a radiation origin point and a normal vector along a direction of interest; representing positions of individual array elements and the corresponding normal vectors with the radiation origin point as the coordinate frame of origin; projecting a position of each of the array elements that contributes to radiation along a direction of interest; computing a window function with desired parameter values, computing weights to be assigned to each of the elements based on relative footprint of each element in the window function; and multiplying a signal of an array element with the weight computed for the particular array element.

According to an embodiment herein, the process for shaping a beam of non-planar 2D array of antennas and shaping a beam of non-planar 3D array of antennas are varied based on a type of application. The type of application comprises faster or leaner implementation, implementing with superior accuracy, antenna projection boundary with a lowest distance and antenna projection boundary with a highest distance.

According to an embodiment herein, a process of a soft demodulation for a quadrature amplitude modulation scheme is provided. The process comprises performing demodulation by defining confidence numbers for individual bits of information and representing mid-points for decision making regarding individual bits from Most-Significant Bit to Least Significant Bit. The soft demodulation process is provided for a plurality of wired and wireless communication systems apart from a millimeter wave communication.

According to an embodiment herein, a process of a hard demodulation for a quadrature amplitude modulation scheme is provided. The process comprises creating a lookup table with entries as a plurality of b-bit values corresponding to each symbol. The hard demodulation process is provided for a plurality of wired and wireless communication systems apart from the millimeter wave communication.

According to an embodiment herein, an uninterrupted communication service is provided with an optimum spectrum utilization. The communication service comprises a combined use of Spatial Division Multiple Access (SDMA) and Frequency Division Multiple Access (FDMA) techniques. The spatial orientations are uniformly divided into a plurality of spatial slots to cover a desired serviceable area. A plurality of frequency bands is assigned to a plurality of spatial slots in such a way that the frequency bands are non-overlapping. The plurality of frequency bands assigned to the plurality of spatial slots is provided with guard bands to prevent interference. The spatial slots are provided to ensure that no two adjacent spatial slots are configured to utilize a same frequency band.

According to an embodiment herein, a step of optimizing the power utilization of the communication system is provided. The step comprises configuring a plurality of small low noise amplifiers or power amplifiers in an antenna element and remainder of the system, and/or increasing a number of array elements along with small low noise amplifiers or power amplifiers. According to an embodiment herein, a plurality of communication methods, such as wired communication (multi-modal optical fibres), RADAR and IR/Visible/UV/X-ray/Terahertz wave based devices, is provided.

According to an embodiment herein, a method is provided for an automatic calibration of an array of receiving antennas. The method comprises the following steps: placing a known transmitting antenna pointed towards a specific orientation ($\theta$, $\varphi$) in far field with respect to receiving antenna which needs to be calibrated; performing an auto-calibration of frequency, phase and amplitude at receiver only for one specific path using standard methods; applying the frequency and amplitude corrections obtained from a specific path to all paths; transmitting a pre-set sequence of data with a predetermined modulation repeating indefinitely from a transmitting antenna, and wherein the sequence of data is similar to/same as that used in standard methods for an auto-calibration of phase in a single path; acquiring data from all paths for a preset duration and maintaining the specific path chosen in the second step as a reference; computing a phase difference in rest of the paths; computing the expected phase difference between the specific path (chosen in the second step) and rest of the paths for signal coming from direction ($\theta$, $\varphi$) using standard theories: subtracting the expected phase difference from an observed phase difference to get a desired correction of phase per path; repeating the above steps for a few more relative orientations ($\theta$, $\varphi$) of transmitting antenna with respect to receiving antenna, to determine an average of correction of phase per path; and, performing post-calibration, by performing the phase corrections in addition to expected phase difference along any direction of reception of signal.

According to an embodiment herein, a method of automatic calibration of an array of transmitting antennas comprises the following steps: placing a known receiving antenna pointing towards a specific orientation ($\theta$, $\varphi$) in a far field with respect to transmitting antenna to be calibrated; performing auto-calibration of frequency, phase and amplitude at receiver while transmitting only from one specific path using standard methods, and wherein, the step of automatic calibration for every path other than the chosen path comprises: deactivating all paths except a current path to be calibrated and chosen path, performing a full sweep of phase offsets (−180 degrees to 180 degrees) for current path in relation to the phase of chosen path; computing a power received at the receiving antenna for each phase offset, picking up the phase offset to provide highest power; computing the expected phase difference between the chosen path and the current path for signal going to direction (θ, φ) using standard theory; subtracting the expected phase difference from observed phase difference to achieve a desired phase correction; and performing a post-calibration by performing the phase correction in addition to expected phase difference for any direction of transmission, and wherein the process is repeated for a plurality of other orientations (θ, φ) to determine an average of phase correction per path.

According to an embodiment herein, a method for an auto-calibration of the positional offsets of an array antenna is provided. Once a phase correction is configured, the system enables estimation and correction for manufacturing inaccuracies in the position of elements in the array. The estimation and correction for transmitting and receiving antenna are performed in following steps: configure one of the elements in the array as reference element; represent the observed and expected phase difference for an element, and wherein the expected phase difference includes the phase correction for a path related to the element; compute the observed and expected phase difference for a plurality of different orientations; store the computed data in a form of matrices; configure a use of least square error principal and obtain 3-dimensional positional offsets corresponding to an element in the array antenna; and, repeat the above for all elements in the array antenna to obtain a relative error with respect to the reference element.

According to an embodiment herein, the method for auto-calibration of positional offsets of array antenna is enabled for antennas where (in which) multiple antenna elements are connected to a fewer paths or RF chain. The method is also enabled for a group of elements per path. When the result comprises some residual errors, which are not exactly captured without a direct phase measurement of individual elements in a group, a plurality of isolators or switches are configured to activate or deactivate the specific elements for the purpose of measurement.

According to an embodiment herein, a flat array configuration of antenna elements is provided for terrestrial applications. For terrestrial applications such as backhaul or front haul, a wide angle steering of the beam is performed only in horizontal plane and not in the vertical plane, as transmitters and receivers are at similar altitudes. A configuration is provided for P2MP systems with a large number of elements along horizontal direction than vertical direction, such as a 90×2 patch element planar array, where 90 is along horizontal and 2 is along vertical and a 90×2 patch element non-planar array, where here again, 90 is along horizontal and 2 is along vertical. A lens or reflector or combination of lens and reflector are provided for achieving necessary beam widths for both horizontal and vertical directions.

Figure 1:
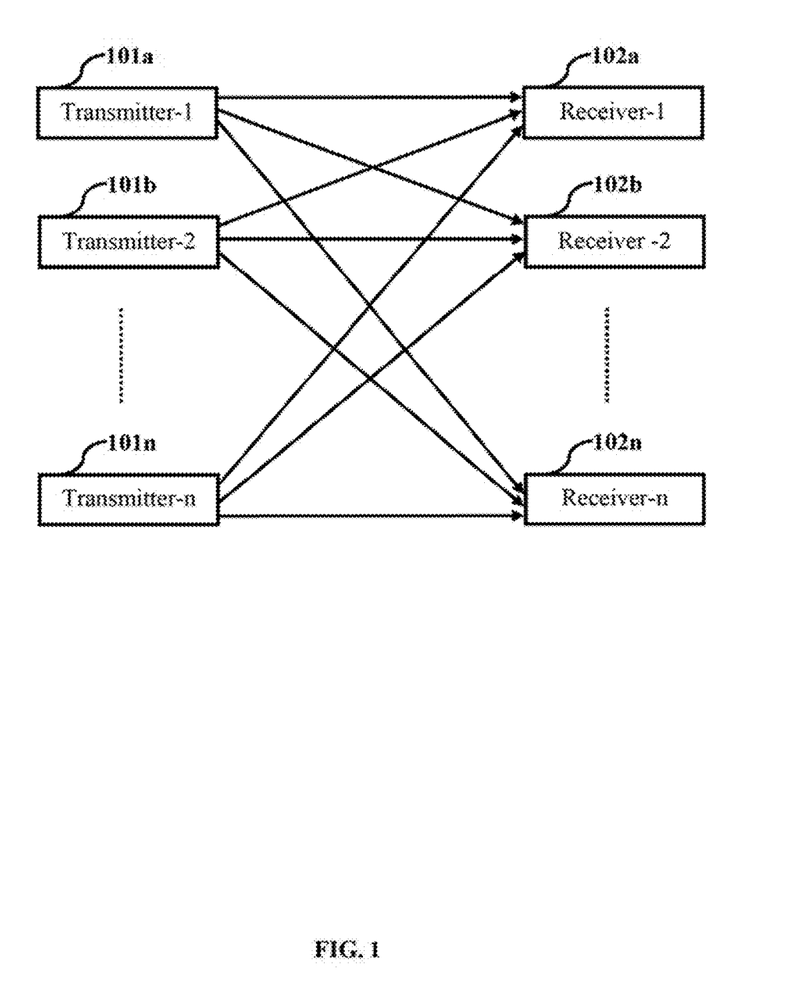
FIG. 1 illustrates a block diagram of a communication system with a plurality of transmitters and receivers, according to an embodiment herein.

FIG. 1 illustrates a block diagram of a plurality of transmitters and receivers in a communication system. The communication system comprises multiple Transmitters 101a, 101b, . . . , 101n and multiple Receivers 102a, 102b, . . . , 102n. The Transmitters 101a, 101b, . . . , 101n and Receivers 102a, 102b, . . . , 102n move with constant or non-constant relative velocities (including zero), which are different for different Transmitters 101a, 101b, . . . , 101n and Receivers 102a, 102b, . . . , 102n. Primary mode of communication is typically with narrow angle beams, where each transmitter and receiver has a plurality of beams originating and terminating. In the present embodiment, a transmitter is enabled to simultaneously act as a receiver, and a receiver is enabled to simultaneously act as a transmitter (not illustrated in the diagram) at different or same frequency bands and/or at different or same time instants.

Figure 2:
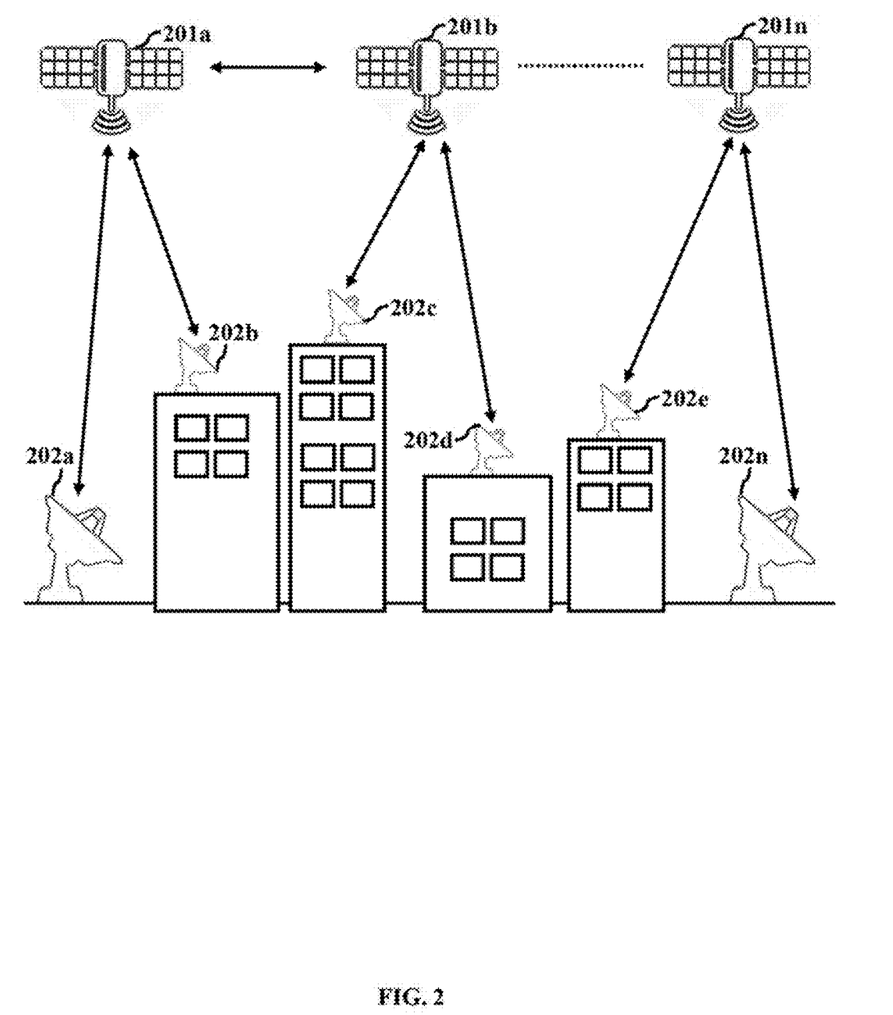
FIG. 2 illustrates a block diagram of a communication system for terrestrial to terrestrial, terrestrial to and from space, and space to space communication systems, according to an embodiment herein.

FIG. 2 illustrates a block diagram of an implementation of the present embodiments herein. A constellation of satellites 201a, 201b, . . . , 201n transmits/receives to/from a plurality of receiver/transmitter arrangements 202a, 202b, . . . 202n. The constellation of satellites is moving with respect to fixed points on ground. In case of low-earth orbit satellites, the satellites move at speeds as high as 8 kms with respect to fixed points on ground. Each footprint or serviceable area of a satellite is covered by multiple narrow angle beams (not illustrated in the figure).

Figure 3:
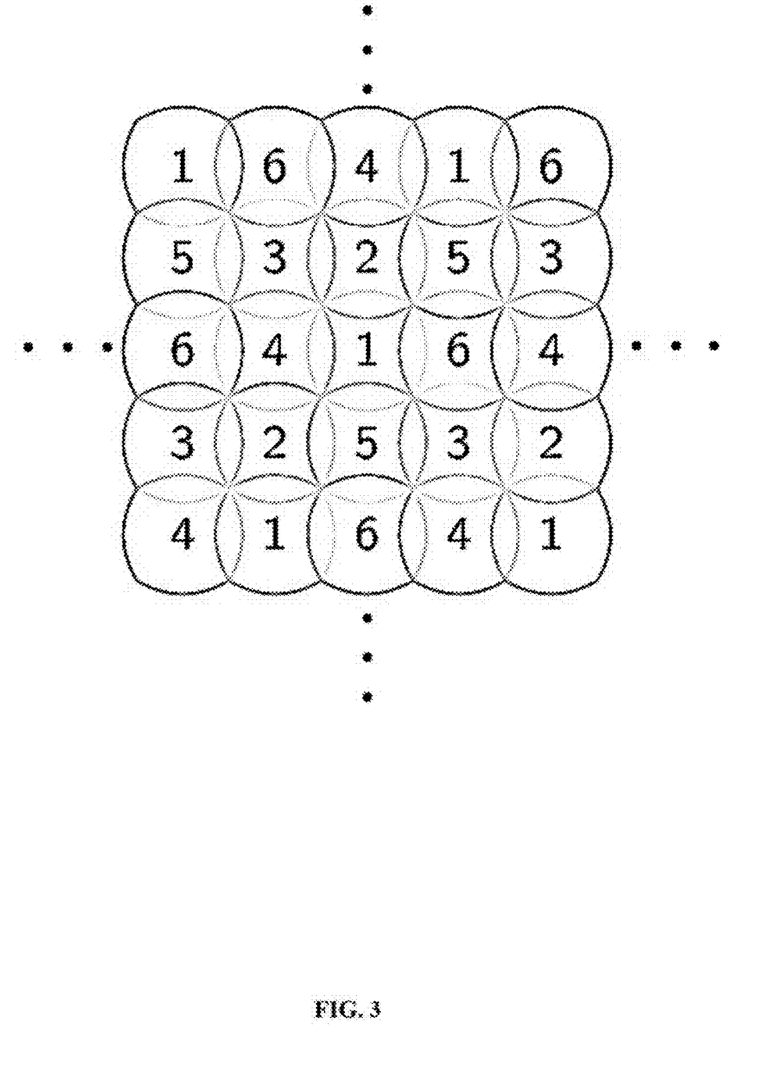
FIG. 3 illustrates an exemplary spatial orientation of uniformly divided multiple spatial slots in a communication system, according to an embodiment herein.

FIG. 3 illustrates an exemplary spatial orientation of uniformly divided multiple spatial slots in a communication system. Spatial orientations are uniformly divided into multiple spatial slots to cover the desired serviceable area. Spatial slots with same number use same frequency band; frequency bands assigned to different numbers are non-overlapping and are enabled with guard bands, if necessary, to prevent interference. The spatial division as illustrated, ensures that no two adjacent spatial slots use the same frequency bands. The primary advantage of present embodiment is that through spatial division as illustrated, it is possible to cover the entire service area, with just six frequency bands. The spatial slots illustrated in FIG. 3 are rectangular, however, the system is configured to enable a plurality of other types of spatial slots and shapes, such as hexagonal or shapes with higher number of sides, and follow the procedure for rectangular slots of frequency reuse in spatial slots.

Figure 4:
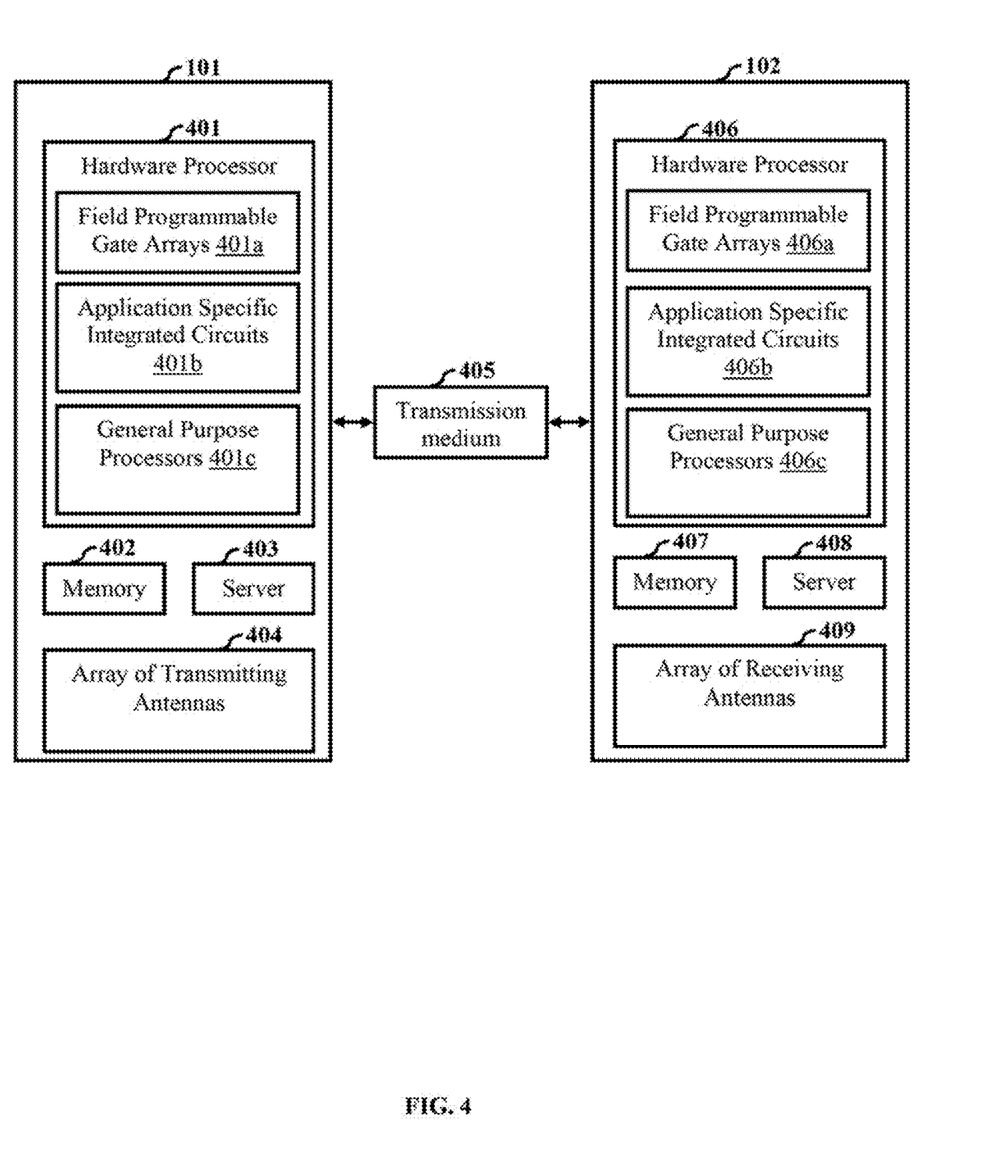
FIG. 4 illustrates a functional block diagram of a communication system for terrestrial to terrestrial, terrestrial to and from space or space to space communication systems in a plurality of frequency bands, according to an embodiment herein.

FIG. 4 illustrates a functional block diagram of a communication system for terrestrial to terrestrial, terrestrial to and from space or space to space communication systems in a plurality of frequency bands. The system comprises a transmitter 101, a receiver 102 and a transmitting medium 405. The transmitter 101 comprises a hardware processor 401, a memory 402, a server 403 and an array of transmitting antennas 404. The hardware processor 401 comprises a plurality of field programmable gate arrays 401a, a plurality of application specific integrated circuits 401b and a plurality of general purpose processors 401c. The receiver 101 comprises a hardware processor 406, a memory 407, a server 408 and an array of receiving antennas 409. The hardware processor 406 comprises a plurality of field programmable gate arrays 406a, a plurality of application specific integrated circuits 406b and a plurality of general purpose processors 401c.

Figure 5A:
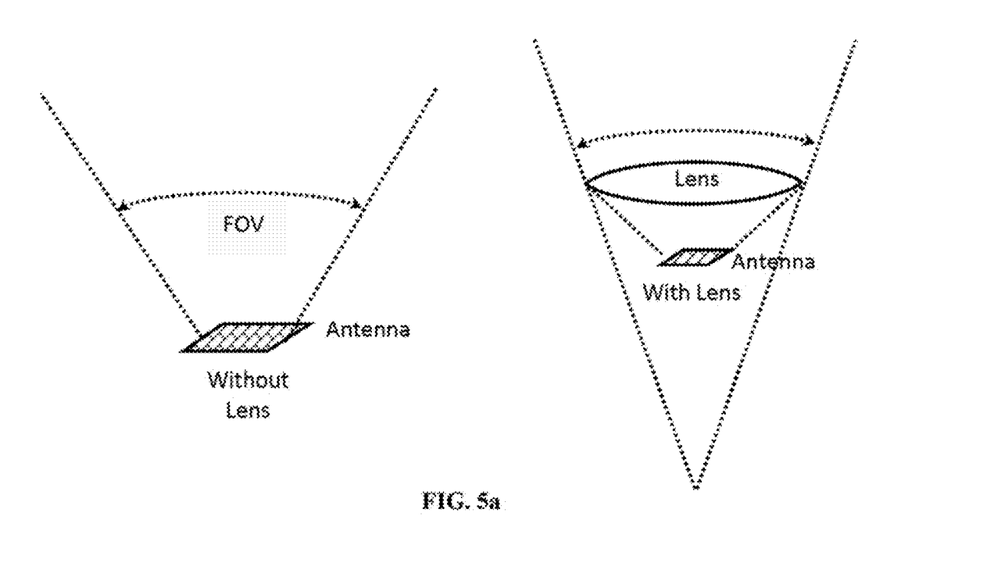
FIG. 5a illustrates an antenna beam formed with a planar array with and without lens assembly, according to an embodiment herein.

FIG. 5a illustrates an antenna beam formed with a planar array with and without lens assembly. An antenna beam formed with a planar array with and without reflector assembly is similar to the illustration in FIG. 5a.

Figure 5B:
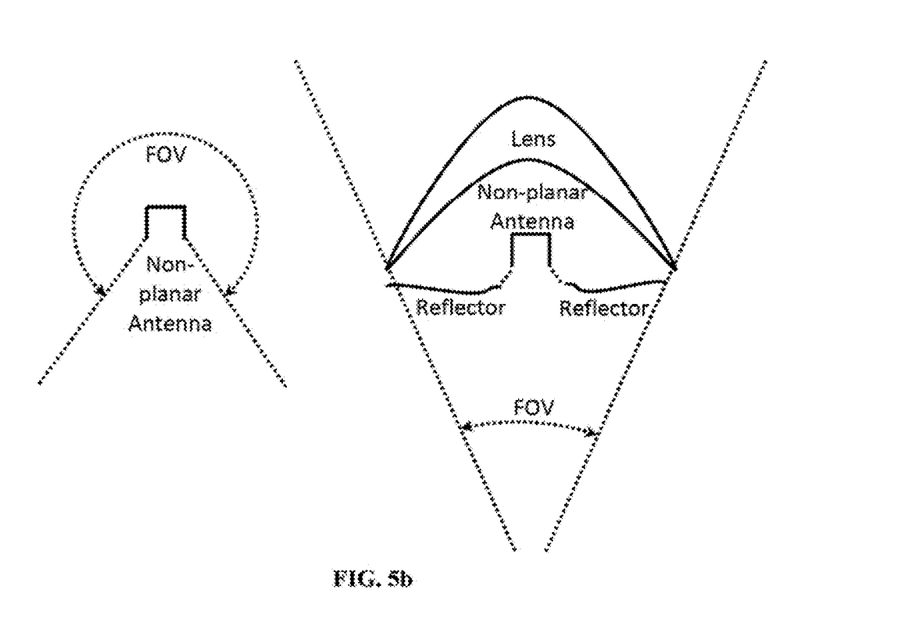
FIG. 5b illustrates an antenna beam formed with a rectangular non-planar array with and without reflector/lens assembly, according to an embodiment herein.

FIG. 5b illustrates an antenna beam formed with a non-planar array with and without reflector/lens assembly.

Figure 6:
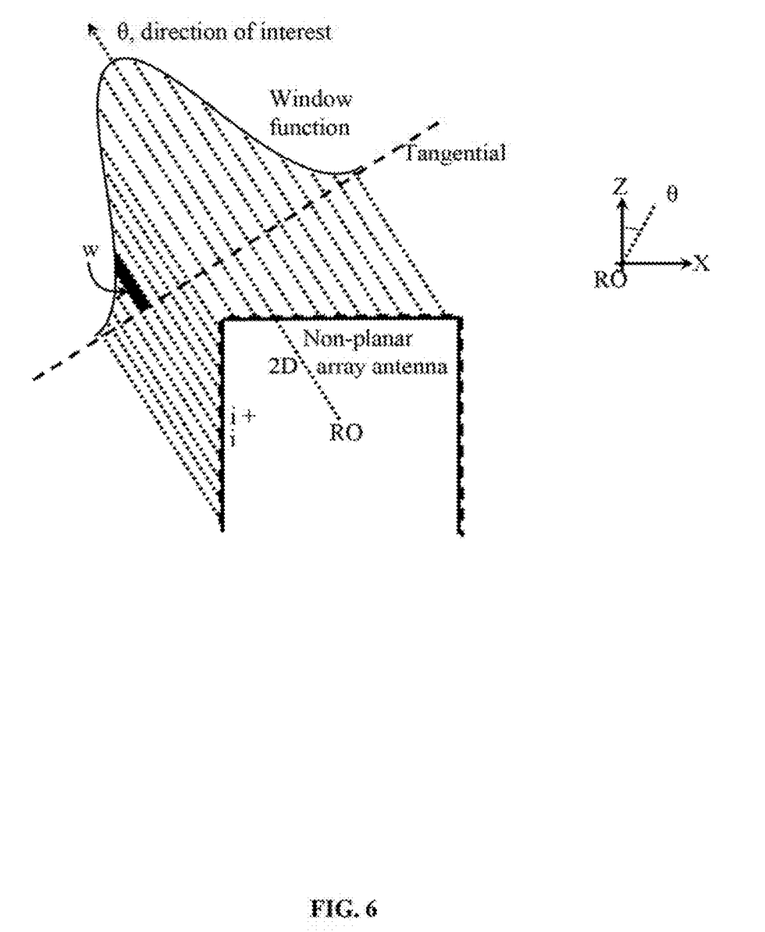
FIG. 6 illustrates a schematic representation of a rectangular non-planar 2D array antenna in a beam shaping process, according to an embodiment herein.

FIG. 6 illustrates a beam shaping technique for a rectangular non-planar 2D array antenna.

Figure 7:
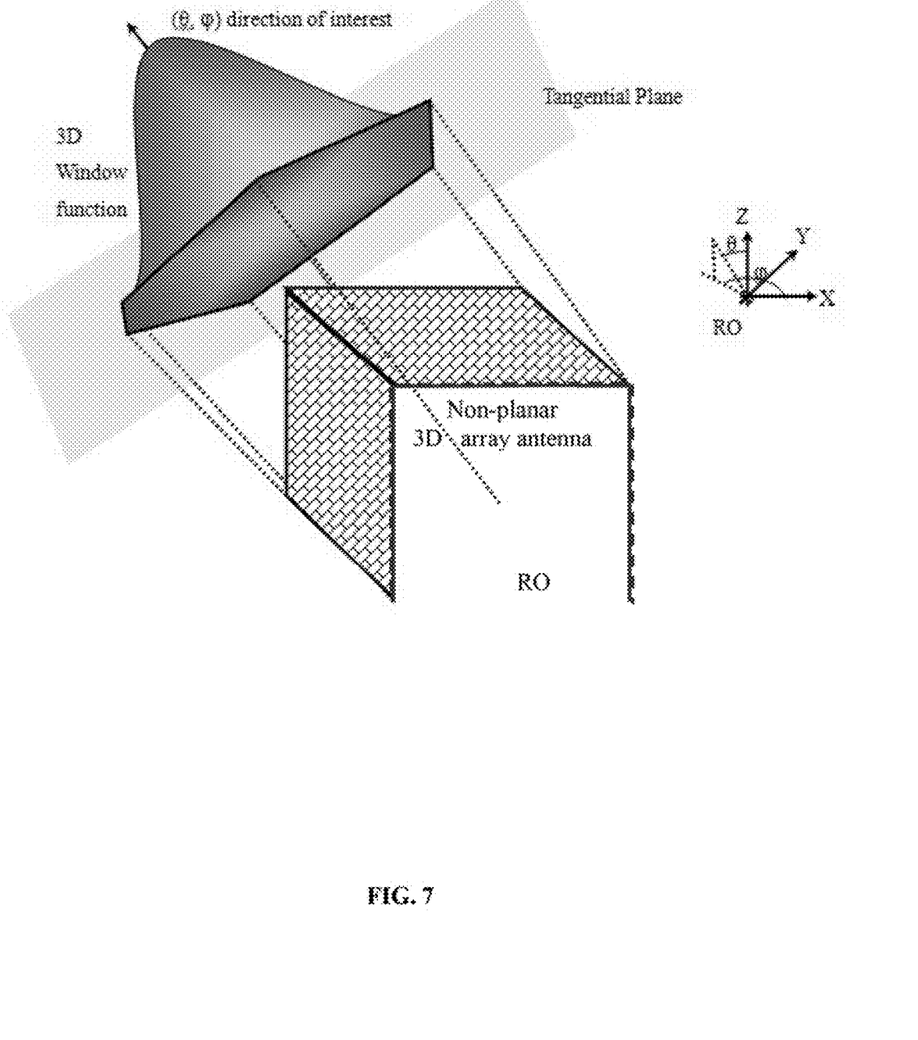
FIG. 7 illustrates a schematic representation of a rectangular non-planar 3D array antenna in a beam shaping technique for, according to an embodiment herein.

FIG. 7 illustrates a beam shaping technique for a rectangular non-planar 3D array antenna.

The embodiments herein provide a system and method for terrestrial to terrestrial or terrestrial and space or space to space communication enabled by millimeter waves of frequencies 57-66 GHz, 66-71 GHz, 71-76 GHz and 81-86 GHz. Currently there are no systems and methods to optimally use millimeter waves in enabling communication. The system enables wide-beam communication between receivers and transmitters which are in relative motion with other receivers and transmitters in the system. The embodiments herein provide uninterrupted service and good spectrum utilization by combining Spatial Division Multiple Access (SDMA) and Frequency Division Multiple Access (FDMA) technologies. The embodiments herein minimize overall power required by a communication system by dynamically enabling and disabling specific channels based on user-availability and need. The system also increases or decreases power based on channel quality in order to maintain desired bit-rate of communication. The system covers a large service area through a plurality of narrow angle signal beams. The system also tracks the transmitter/receiver by steering the signal beams.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

What is claimed is:

1. A system for one-to-many and/or many-to-many communication using a point-to-multipoint communication technology with millimeter waves, the system comprising:

a plurality of transmitters, and wherein each of the plurality of transmitters comprise a hardware processor, a memory, a server and an array of transmitting antennas, and wherein each of the hardware processor further comprises a plurality of field programmable gate arrays, a plurality of general purpose processors and a plurality of application specific integrated-circuits and wherein the field programmable gate arrays and the application specific integrated circuits are configured to process all the information transmitted from the transmitter to perform a delay correction related to a beam-forming delay, and wherein the field programmable gate arrays and the application specific integrated circuits are configured to perform a delay correction related to a beam-forming delay in baseband rather than after a high frequency (millimeter wave) carrier is applied, to dynamically change the number of beams, and wherein the hardware processor is configured to minimize an overall power required by dynamically enabling and disabling specific channels based on a user-availability and a requirement, and wherein the hardware is also configured to increase or decrease power to specific narrow beams based on a desired channel quality;

a plurality of receivers, and wherein each the plurality of receivers comprise a hardware processor, a memory, a server and an array of receiving antennas, and wherein each of the hardware processor further comprises a plurality of field programmable gate arrays, a plurality of general purpose processors and a plurality of application specific integrated circuits, and wherein the field programmable gate arrays and the application specific integrated circuits are configured to process all information received in the receiver to perform a delay correction related to a beam-forming delay, and wherein the field programmable gate arrays and the application specific integrated circuits are configured to perform a delay correction related to a beam-forming delay in baseband rather than after a high frequency (millimeter wave) carrier is applied, to dynamically change the number of beams, and wherein the hardware processor is configured to minimize an overall power required by dynamically enabling and disabling specific channels based on a user-availability and a requirement, and wherein the hardware is also configured to increase or decrease power to specific narrow beams based on a desired channel quality;

a transmitting medium;

Quadrature Amplitude Modulation (QAM) scheme for modulation and demodulation, and wherein demodulation is performed through soft demodulation and hard demodulation techniques;

a plurality of small low noise amplifiers or power amplifiers in an antenna element configured to provide an uninterrupted communication service with an optimized power consumption for a plurality of channel conditions; and wherein a plurality of beams is formed with transmitting/receiving antenna for efficient re-use of a spectrum through a combined use of Spatial Division Multiple Access (SDMA) and Frequency Division Multiple Access (FDMA) techniques;

wherein the hardware processor is configured to perform an auto-calibration process for positional offsets of array antenna, and wherein the process estimates and corrects for manufacturing inaccuracies in position of elements in the array after a phase correction is performed for the array antenna, and wherein the process for estimation and correction for transmitting and receiving antenna is performed to:

configure one of the elements in the array as reference element;

represent the observed and expected phase difference for an element, and wherein the expected phase difference includes the phase correction for path related to the element;

compute the observed and expected phase difference for a plurality of different orientations;

store the computed data in form of matrices;

configure the use of least square error principal and obtain 3-dimensional positional offsets corresponding to element in the array antenna; and repeat the above steps for all elements in the array antenna to obtain the relative error with respect to the reference element.

2. The system according to claim 1, wherein each of the plurality of transmitters comprises a server, and wherein each of the server comprises all the information that is transmitted and the data that enables the transmission of the information, and wherein the data in the server controls the higher level functioning of the transmitter.

3. The system according to claim 1, wherein each of the plurality of receivers comprises a server, and wherein each of the server comprises all the information that is received and the data that enables receiving the information, and wherein the data in the server controls the higher level functioning of the receiver.

4. The system according to claim 1, wherein the plurality of transmitters and receivers are relatively in motion with each other.

5. A method for establishing one-to-many and/or many-to-many communication using a point-to-multipoint communication technology enabled by millimeter waves, the method comprising:
 defining a process for a formation of maximum number of multiple beams that is physically attainable by an array of antennas;
 configuring a plurality of non-planar array of elements with or without a reflector/lens assembly to achieve an electronically wide-steerable narrow-beam antenna;
 shaping a beam of a non-planar 3D array of antenna and non-planar 2D array of antenna to optimize a performance of the antennas;
 performing a soft demodulation for a quadrature amplitude modulation scheme;
 performing a hard demodulation for a quadrature amplitude modulation scheme;
 providing an uninterrupted communication service with optimized spectrum utilization through a combined use of Spatial Division Multiple Access (SDMA) and Frequency Division Multiple Access (FDMA) techniques;
 acquiring information and tracking data of a transmitter and/or a receiver;
 optimizing a power utilization of the communication system;
 automatically calibrating an array of antennas; and,
 configuring an array of antennas enabled to operate for terrestrial applications;
 wherein the plurality of non-planar array of elements with or without a reflector/lens assembly is configured to achieve an electronically wide-steerable narrow-beam antenna through a use of a plurality of non-planar array of elements with or without a reflector/lens assembly, and wherein the non-planar array is configured for very large steerability angle of 360 degrees, and wherein the non-planar array in combination of lens/reflector is configured to achieve an electronically wide-steerable narrow-beam antenna, and wherein the non-planar array is of a plurality of shaves including square, trapezoidal, hexagonal, circular and spherical, and wherein the non-planar array is configured for a plurality of types of lens and reflectors, and wherein a beam of a non-planar 2D and 3D array of antennas is shaped by a process comprising the steps of:
 defining a radiation origin point and a normal vector along a direction of interest;
 representing positions of individual array elements and the corresponding normal vectors with the radiation origin point as the coordinate frame of origin;
 projecting a position of each of the array elements that contributes to radiation along a direction of interest;
 computing a window function with desired parameter values;
 computing weights to be assigned to each of the elements based on relative footprint of each element in the window function; and
 multiplying a signal of an array element with the weight computed for the particular array element.

6. The method according to claim 5, wherein the process for shaping a beam of non-planar 2D array of antennas and shaping a beam of non-planar 3D array of antennas are varied based on a type of application, and wherein the type of application comprises faster or leaner implementation, implementing with superior accuracy, considering a lowest distance antenna projection boundary and considering highest distance antenna projection boundary.

7. The method according to claim 5, wherein a process of a soft demodulation for a quadrature amplitude modulation scheme comprises performing demodulation by defining confidence numbers for individual bits of information and representing mid-points for decision making regarding individual bits from Most-Significant Bit to Least Significant Bit.

8. The method according to claim 5, wherein a process of a hard demodulation for a quadrature amplitude modulation scheme comprises creating a lookup table with entries as a plurality of b-bit values corresponding to each symbol.

9. The method according to claim 5, wherein an uninterrupted communication service is provided with the optimized spectrum utilization comprises a combined use of Spatial Division Multiple Access (SDMA) and Frequency Division Multiple Access (FDMA) techniques, and wherein spatial orientations are uniformly divided into a plurality of spatial slots to cover a desired serviceable area, and wherein a plurality of frequency bands assigned to a plurality of spatial slots are non-overlapping and wherein the plurality of frequency bands assigned to the plurality of spatial slots are provided with guard bands, to prevent interference, and wherein the spatial slots are provided to ensure that no two adjacent spatial slots are configured to utilize a same frequency band.

10. The method according to claim 5, wherein a step of optimizing the power utilization of the communication system comprises configuring a plurality of small low noise amplifiers or power amplifiers an antenna element and remainder of the system, and/or increasing a number of array elements along with small low noise amplifiers or power amplifiers.

11. The method according to claim 5, wherein a step of automatic calibration of an array of receiving antennas comprises the following steps:
 placing a known transmitting antenna pointing towards a specific orientation $(\theta, \varphi)$ in far field with respect to receiving antenna which needs to be calibrated;
 performing auto-calibration of frequency, phase and amplitude at receiver only for one specific path using standard methods;
 applying the frequency and amplitude corrections obtained from a specific path to all paths;
 transmitting a pre-set sequence of data with a predetermined modulation repeating indefinitely from a transmitting antenna, and wherein the sequence of data is similar to/same as that used in standard methods of phase auto-calibration for single path;
 acquiring data from all paths for a preset duration and maintaining the specific path chosen in the second step as a reference;
 computing a phase difference in rest of the paths;
 computing the expected phase difference between the specific path (chosen in step 2) and rest of the paths for signal coming from direction $(\theta, \varphi)$ using standard theories;
 subtracting the expected phase difference from an observed phase difference to get a desired correction of phase per path;

repeating the above steps for a few more relative orientations (θ, φ) of transmitting antenna with respect to receiving antenna, to determine an average of correction of phase per path; and, performing post-calibration, by performing the phase corrections in addition to expected phase difference along any direction of reception of signal.

12. The method according to claim 5, further comprises:

placing a known receiving antenna pointing towards a specific orientation (θ, φ) in a far field with respect to transmitting antenna to be calibrated;

performing auto-calibration of frequency, phase and amplitude at receiver while transmitting only from one specific path using standard methods, and wherein, the step of automatic calibration for every path other the chosen path comprises:

deactivating all paths except current path to be calibrated and chosen path, performing a full sweep of phase offsets (−180 degrees to 180 degrees) for current path in relation to the phase of chosen path;

computing a power received at the receiving antenna for each phase offset, picking up the phase offset to provide highest power;

computing the expected phase difference between the chosen path and the current path for signal going to direction (θ, φ) using standard theory;

subtracting the expected phase difference from observed phase difference to achieve a desired phase correction; and performing a post-calibration by performing the phase correction in addition to expected phase difference for any direction of transmission, and wherein the process is repeated for a plurality of other orientations (θ, φ) to determine an average of phase correction per path.

13. The method according to claim 5, further comprises a process for auto-calibration of positional offsets of array antenna, and wherein the process estimates and corrects for manufacturing inaccuracies in position of elements in the array after a phase correction is performed for the array antenna, and wherein the process for estimation and correction for transmitting and receiving antenna comprises:

configuring one of the elements in the array as reference element;

representing the observed and expected phase difference for an element, and wherein the expected phase difference includes the phase correction for path related to the element;

computing the observed and expected phase difference for a plurality of different orientations;

storing the computed data in form of matrices;

configuring the use of least square error principal and obtain 3-dimensional positional offsets corresponding to element in the array antenna; and, repeating the above steps for all elements in the array antenna to obtain the relative error with respect to the reference element.

14. A method for establishing one-to-many and/or many-to-many communication using a point-to-multipoint communication technology enabled by millimeter waves, the method comprises:

defining a process for a formation of maximum number of multiple beams that is physically attainable by an array of antennas;

performing a process of a soft demodulation for a quadrature amplitude modulation scheme, and wherein the process of a soft demodulation for a quadrature amplitude modulation scheme comprises performing demodulation by defining confidence numbers for individual bits of information and representing mid-points for decision making regarding individual bits from Most-Significant Bit to Least Significant Bit;

performing a process of a hard demodulation for a quadrature amplitude modulation scheme, and wherein the process of a hard demodulation for a quadrature amplitude modulation scheme comprises creating a lookup table with entries as a plurality of b-bit values corresponding to each symbol;

providing an uninterrupted communication service with optimized spectrum utilization through a combined use of Spatial Division Multiple Access (SDMA) and Frequency Division Multiple Access (FDMA) techniques;

acquiring information and tracking data of a transmitter and/or a receiver;

optimizing a power utilization of the communication system;

automatically calibrating an array of antennas; and, configuring an array of antennas enabled to operate for terrestrial applications;

wherein a step of automatic calibration of an array of receiving antennas comprises the following steps of:

placing a known transmitting antenna pointing towards a specific orientation (θ, φ) in far field with respect to receiving antenna which needs to be calibrated;

performing auto-calibration of frequency, phase and amplitude at receiver only for one specific path using standard methods;

applying the frequency and amplitude corrections obtained from a specific path to all paths;

transmitting a ore-set sequence of data with a predetermined modulation repeating indefinitely from a transmitting antenna, and wherein the sequence of data is similar to/same as that used in standard methods of phase auto-calibration for single path;

acquiring data from all paths for a preset duration and maintaining the specific path chosen in the second step as a reference;

computing a phase difference in rest of the paths;

computing the expected phase difference between the specific path and rest of the paths for signal coming from direction (θ, φ) using standard theories;

subtracting the expected phase difference from an observed phase difference to get a desired correction of phase per path;

repeating the above steps for a few more relative orientations (θ, φ) of transmitting antenna with respect to receiving antenna, to determine an average of correction of phase per path; and performing post-calibration, by performing the phase corrections in addition to expected phase difference along any direction of reception of signal.

15. The method according to claim 14, further comprises:

placing a known receiving antenna pointing towards a specific orientation (θ, φ) in a far field with respect to transmitting antenna to be calibrated;

performing auto-calibration of frequency, phase and amplitude at receiver while transmitting only from one specific path using standard methods, and wherein, the step of automatic calibration for every path other the chosen path comprises:

deactivating all paths except current path to be calibrated and chosen path, performing a full sweep of phase offsets (−180 degrees to 180 degrees) for current path in relation to the phase of chosen path;

computing a power received at the receiving antenna for each phase offset, picking up the phase offset to provide highest power;

computing the expected phase difference between the chosen path and the current path for signal going to direction ($\theta$, $\varphi$) using standard theory;

subtracting the expected phase difference from observed phase difference to achieve a desired phase correction; and performing a post-calibration by performing the phase correction in addition to expected phase difference for any direction of transmission, and wherein the process is repeated for a plurality of other orientations ($\theta$, $\varphi$) to determine an average of phase correction per path.

16. The method according to claim 15, further comprises a process for auto-calibration of positional offsets of array antenna, and wherein, the process estimates and corrects for manufacturing inaccuracies in position of elements in the array after a phase correction is performed for the array antenna, and wherein the process for estimation and correction for transmitting and receiving antenna comprises:

configuring one of the elements in the array as reference element;

representing the observed and expected phase difference for an element, where the expected phase difference includes the phase correction for path related to the element;

computing the observed and expected phase difference for a plurality of different orientations;

storing the computed data in form of matrices;

configuring the use of least square error principal and obtain 3-dimensional positional offsets corresponding to element in the array antenna; and, repeating the above steps for all elements in the array antenna to obtain the relative error with respect to the reference element.

\* \* \* \* \*